United States Patent [19]
Heck et al.
[11] 3,916,113
[45] Oct. 28, 1975

[54] METHOD AND APPARATUS FOR ON LINE EXPANSION OF COMMUNICATION SWITCHING SYSTEM CALL PROCESSING CAPABILITIES

[75] Inventors: Dennis A. Heck, Franklin Park, Ill.; Howard R. Miller, College Station, Tex.; Leo J. Putchinski, Jr., Wheeling; Kenneth W. Vanderlei, Wheaton, both of Ill.

[73] Assignee: GTE Automatic Electric Laboratories Incorporated, Northlake, Ill.

[22] Filed: Feb. 27, 1974

[21] Appl. No.: 446,433

[52] U.S. Cl. .............................................. 179/18 ES
[51] Int. Cl.$^2$ .......................................... H04Q 3/54
[58] Field of Search .. 179/18 ES, 175.2 R, 175.2 C, 179/18 E, 18 AG

[56] References Cited

UNITED STATES PATENTS

| | | | |
|---|---|---|---|
| 3,253,262 | 5/1966 | Wilenitz et al. | 340/172.5 |
| 3,336,442 | 8/1967 | Casterline et al. | 179/18 ES |
| 3,409,877 | 11/1968 | Alterman et al. | 340/172.5 |
| 3,504,129 | 3/1970 | Ewin et al. | 179/18 AG |
| 3,522,387 | 7/1970 | Schonemeyer et al. | 179/18 E |
| 3,613,089 | 10/1971 | Karp | 340/172.5 |
| 3,647,979 | 3/1972 | Rubin | 179/18 ES |

*Primary Examiner*—Thomas W. Brown

[57] ABSTRACT

A method and apparatus of on-line expansion of call processing capabilities of a communication switching system, such as a telephone system, having a switching network for establishing connections between calling and called lines in response to common equipment and having space-divided equipment units, such as junctors and others, communicating with the common equipment for performing control operations, includes providing additional space-divided equipment units and testing them in-circuit during on-line operation of the system before permitting them to be used by the system. The additional space-divided units are installed in the system before it is initially cut into service, but the additional units are rendered inoperative by storing information concerning each unit in a system memory until the additional units are needed for expansion purposes.

2 Claims, 9 Drawing Figures

METHOD AND APPARATUS FOR ON LINE EXPANSION OF COMMUNICATION SWITCHING SYSTEM CALL PROCESSING CAPABILITIES

BACKGROUND OF THE INVENTION

1. Field of the Invention

The present invention relates to a method and apparatus for the on-line expansion of call processing capabilities of a communication switching system by providing additional active system equipment units of handling larger quantities of calls.

2. Description of the Prior Art

On-line communication switching systems, such as electronic telephone systems, have included switching networks for establishing connections between calling and called lines in response to common equipment and having a plurality of groups of space-divided equipment units, such as register junctors, originating junctors, terminating junctors, senders, receivers and other such units or circuits, for communicating on an as-needed basis with the common equipment for performing call processing control operations to further the connections between the calling and the called lines. After such a system is in use for a period of time, it frequently becomes desirable to serve addition subscribers to the system. In such a situation, it is desirable to provide additional active equipment to expand the call processing capabilities of the system for satisfying the greater demand for service. However, in an on-line system, it is undesirable and in many instances not at all feasible to de-activate the system for a sufficient period of time to add the new equipment for expansion purposes, since the system is unable to handle calls for service, some of which may be emergency calls, when the system is off line. For this reason, it is, therefore, oftentimes necessary for the system to be equipped at the time of its initial installation for handling a far greater number of calls than is actually necessary for the number of subscribers to be served initially. As a result, the system is equipped to a far greater extent than is required for meeting the needs of the subscribers when the system is initially cut into service. Hence, such a system would not be operating at peak efficiency since much of the system would be seldom, if ever, used. Also, it is difficult to predict with any degree of accuracy what the future requirements might be for a given system, and therefore it is difficult to know what the call processing capabilities of a given system ought to be. Therefore, it would be highly desirable to have a method and apparatus for facilitating the on-line expansion of a communication switching system in an efficient manner so that the call processing capacity of the system as initially installed would be of such an amount as to be adequate to handle present requirements without having excessive amounts of equipment, such as the space-divided equipment, while being able to expand the call processing capabilities in the future in an on-line manner.

SUMMARY OF THE INVENTION

Therefore, the principal object of the present invention is to provide a new and improved method and apparatus for expanding the call processing capabilities of a communication switching system in an on-line manner without the need for causing the system to interrupt service to subscribers.

Briefly, the above and further objects are realized in accordance with the present invention by providing the system with additional space-divided equipment units and testing them in-circuit during on-line operation of the system before permitting them to be used by the system for processing calls. The additional space-divided units are installed in the system before it is initially cut into service, but they are rendered inoperative by storing information concerning each unit in a system memory until the additional units are needed for expansion purposes. Thus, the additional units are connected into the system and tested therein prior to the time of initial installation so that there is no need to have the extra equipment wired into the system at the location of the system in use. The additional hardware equipment does not add as much to the initial cost of the system as compared to having the extra equipment installed at the location of the system.

CROSS-REFERENCE TO RELATED APPLICATIONS

The preferred embodiment of the invention is incorporated in a COMMUNICATION SWITCHING SYSTEM WITH MARKER, REGISTER, AND OTHER SUBSYSTEMS COORDINATED BY A STORED PROGRAM CENTRAL PROCESSOR, U.S. Pat. application Ser. No. 130,133 filed Apr. 1, 1971 by K. E. Prescher, R. E. Schauer and F. B. Sikorski, now abandoned, and a continuation-in-part thereof Ser. No. 342,323 filed Mar. 19, 1973, now U.S. Pat. No. 3,835,260 issued Sept. 10, 1974, hereinafter referred to as the SYSTEM application. The system may also be referred to as No. 1 EAX or simply EAX.

The memory access, and the priority and interrupt circuits for the register-sender subsystems are covered by U.S. Pat. application Ser. No. 139,480 filed May 3, 1971 now U.S. Pat. No. 3,729,715 issued Apr. 24, 1973 by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM, hereinafter referred to as the REGISTER-SENDER MEMORY CONTROL patent application. The register-sender subsystem is described in U.S. Pat. application Ser. No. 201,851 filed Nov. 24, 1971 now U.S. Pat. No. 3,737,873 issued June 5, 1973 by S. E. Puccini for DATA PROCESSOR WITH CYCLIC SEQUENTIAL ACCESS TO MULTIPLEXED LOGIC AND MEMORY, hereinafter referred to as the REGISTER-SENDER patent application. Maintenance hardware features of the register-sender are described in the U.S. Pat. application filed July 12, 1972, Ser. No. 270,909, now U.S. Pat. No. 3,784,801 issued Jan. 8, 1974, by J. P. Caputo and F. A. Weber for a DATA HANDLING SYSTEM ERROR AND FAULT DETECTING AND DISCRIMINATING MAINTENANCE ARRANGEMENT this application being referred to hereinafter as the REGISTER-SENDER MAINTENANCE patent application.

The marker for the system is disclosed in the U.S. Pat. No. 3,681,537, issued Aug. 1, 1972 by J. W. Eddy, H. G. Fitch, W. F. Mui and A. M. Valente for a MARKER FOR COMMUNICATION SWITCHING SYSTEM hereinafter referred to as the MARKER patent.

The communication register and the marker transceivers are described in U.S. Pat. application Ser. No. 320,412 filed Jan. 2, 1973, now U.S. Pat. No. 3,814,859 issued June 4, 1974, by J. J. Vrba and C. K.

Buede[illegible] COMMUNICATION SWITCHING SYSTEM TRANSCEIVER ARRANGEMENT FOR SERIAL TRANSMISSION, hereinafter referred to as the COMMUNICATION REGISTER patent application.

The executive program for the data processor unit is disclosed in U.S. Pat. application Ser. No. 347,281 filed Apr. 2, 1973 by C. A. Kalat, E. F. Wodka, A. W. Clay and P. R. Harrington for a STORED PROGRAM CONTROL IN A COMMUNICATION SWITCHING SYSTEM, hereinafter referred to as the EXECUTIVE PROGRAM patent application.

The computer third party circuit is disclosed in U.S. Pat. application Ser. No. 348,575, filed Apr. 6, 1973 for a DATA PROCESSOR SYSTEM DIAGNOSTIC ARRANGEMENT by L. V. Jones et al, hereinafter referred to as the THIRD PARTY patent application. The data processor system localization program is disclosed in U.S. Pat. application Ser. No. 348,541, filed Apr. 6, 1973 for a METHOD OF LOCALIZING THE CAUSES OF MALFUNCTIONS OCCURRING IN A DATA PROCESSOR SYSTEM by P. J. Keehn, R. C. Wegner, D. C. Robbins, D. Chang, W. K. Yuan and J. L. Clements, hereinafter referred to as the COMPUTER LOCALIZATION PROGRAM patent application.

The automatic test system for the system is disclosed in the following U.S. Pat. application: Crosley application Ser. No. 446,575, filed Feb. 26, 1974.

The above system, register-sender, marker communication register, executive program, third party, computer localization program and automatic test system patents and applications are incorporated herein and made a part hereof as though fully set forth.

DESCRIPTION OF THE PREFERRED EMBODIMENT

The communication switching system employing the method and apparatus of the present invention is disclosed in the foregoing mentioned patent and patent applications incorporated herein and made a part hereof by reference, and the method and apparatus of the present invention may be employed with the system, it being understood that such method and apparatus may also be employed in other systems as well. The system disclosed in the cited patents and patent applications includes an automatic test system having generators and detectors and employing certain features necessary for verifying the functional operation of spacedivided apparatus such as junctors, trunks, senders and receivers, both routinely and during the call processing service expansion or growth of an operational electronic telephone switching office.

Figure 1:
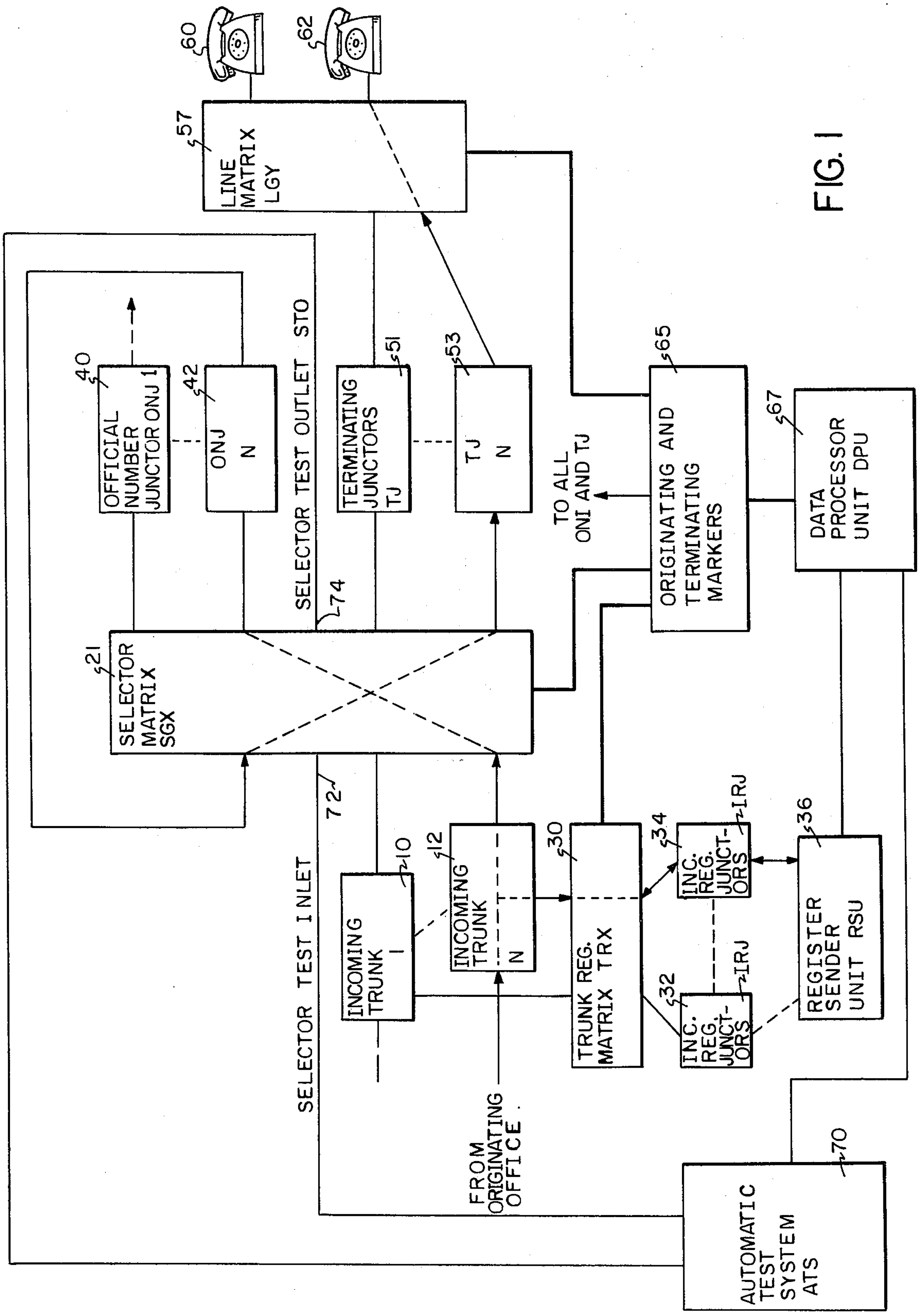
FIG. 1 is a block diagram of a communication switching system incorporating the principles of the present invention.

Referring now to the drawings and more particularly to FIG. 1 thereof, there is shown a plurality of incoming trunk circuits 10 and 12 which are used as interface hardware from another telephone switching central office. The incoming trunks are connected to a selector matrix SGX 21 for selective switching purposes as well as a trunk register matrix TRX 30 which is used to receive from and send signals to an originating telephone switching office (not shown). On the opposite side of the matrix TRX there are a plurality of incoming register junctors, such as the junctors IRJ 32 and 34 which serve as interface circuits for the register sender unit 36 including the control logic for receiving and sending signals to and from otehr telephone switching offices (not shown). Connected to the opposite side of the matrix SGX are a plurality of official number junctors ONJ, such as the junctors 40 and 42 which are used during processing of special classes of telephone calls to block a ticketing subsystem, not shown, from recording information concerning billing, thereby preventing billing of the call in the case of official numbers, such as police, fire department or other such subscribers. The junctor ONJ as used in a telephone call is connected to the incoming side of the matrix SGX 21 where it is switched to one of a plurality of terminating junctors, such as the junctors TJ 51 and 53. The junctor TJ provides isolation and signal separation interfaces between the calling and called parties. The junctor TJ is also connected to a line matrix LGX 57 where it is switched to one of a plurality of telephone subscriber's equipment, such as the equipment 60 and 62. Operation of the matrix TRX, the matrix SGX and the matrix LGX as well as the junctors ONJ and TJ are controlled through the use of originating and terminating markers 65 which are centrally controlled by software programs residing in a data processor unit 67. Functional periodic routine testing of the junctors ONJ and TJ for the purpose of insuring continued proper operation is performed through the use of the hardware circuits contained in an automatic test system 70 under control of software programs which reside in the DPU unit 67. The system ATS obtains testing access to the spacedivided equipment, such as the junctors ONJ and the other such units through use of the selector test inlet STI 72 and the selector test outlet STO 74.

Figure 2:
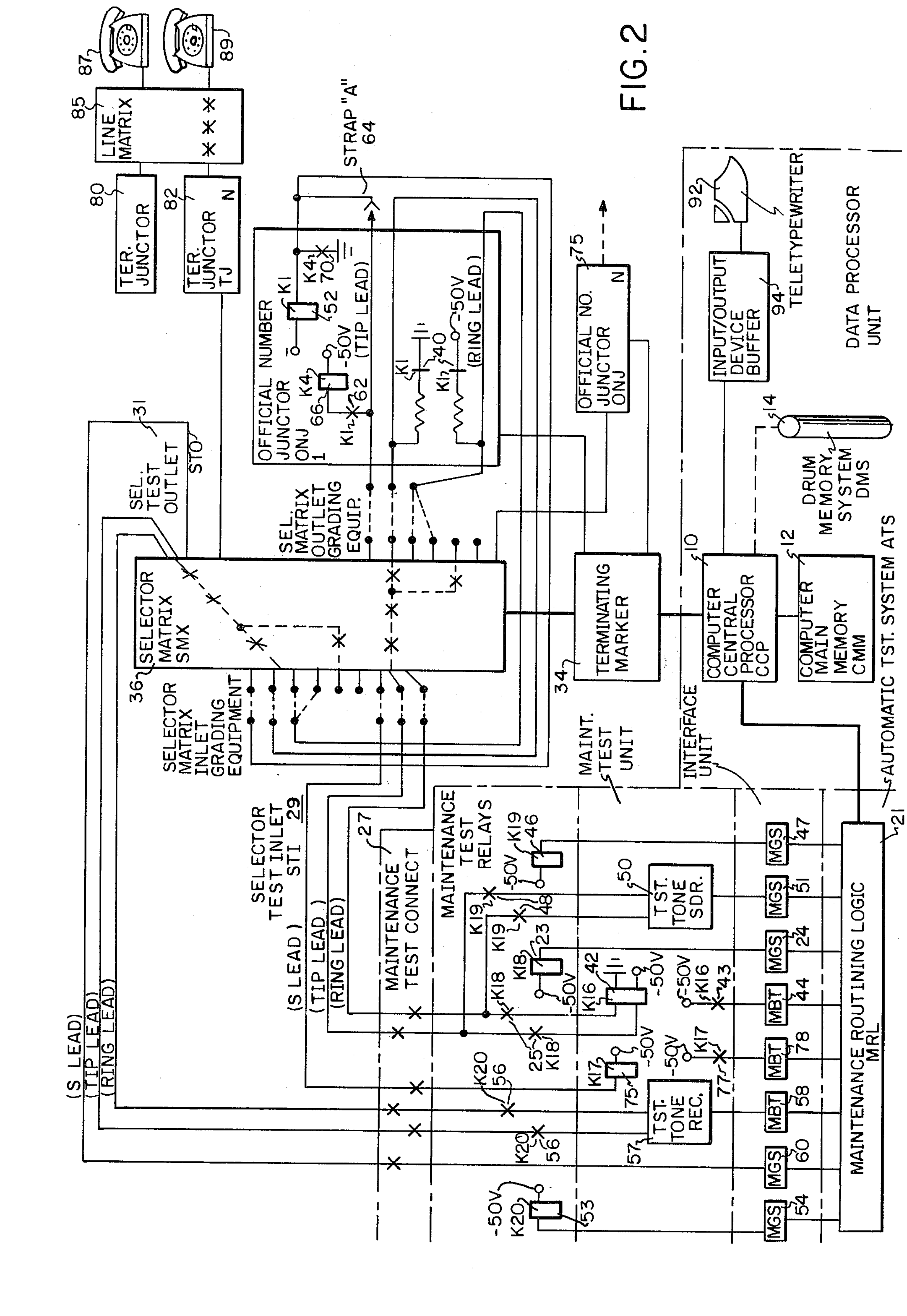
FIG. 2 is a more detailed symbolic and functional block diagram of the system as shown in FIG. 1.

Considering now the method and apparatus of the present invention in greater detail with reference to FIG. 2 of the drawings, the system ATS operates under control of software programs operating in a computer central processor 10 of the data processor unit and whose logical sequence of instructions are stored in a computer main memory CMM 12 and a drum memory system DMS 14. Assume in an example operation of the system ATS that an official number junctor ONJ is to be functionally tested for proper operation. Under control of software programs executed by the processor CCP 10, the maintenance routining logic circuit 21 of the ATS system is instructed to first perform a direct current continuity test of junctor ONJ. The hardware logic circuits (not shown herein) of the MRL circuit 21 causes a K18 relay 23 to operate through a main ground switch MGS 24 causing K18 relay contacts 25 to close. The MRL circuit also causes a maintenance test connect 27 to operate thus connecting a tip lead, a ring lead and a S-lead of a selector test inlet STI and a selector test outlet STO to be connected to the system ATS hardware. The software program operating in the processor CCP also instructs a terminating marker 34 to connect a network path through a selector matrix 36 from the inlet STI 29 to one side of a junctor ONJ 39 and another path from the other side of the junctor ONJ to the outlet STO 31. The system ATS hardware now being connected to the junctor ONJ senses direct current continuity through the normally closed K1 relay contacts 40 causing K16 relay 42 to operate and closing K16 relay contact 43 and connecting the 50 volt source through the main battery switch 44 to the circuit MRL logic. The next test performed on the junctor ONJ is an alternating current continuity test. With K18 relay not operated, K19 relay operates through MGS 47 to close K19 relay contacts 48 connecting the test tone sender 50 through MGS 51 between the logic circuit MRL and the inlet LTI. A K20 relay also operates through MGS 54 to close K20 relay contacts 56 connecting the test tone receiver 57 through MBT 58 between the logic circuit MRL and the outlet STO. A ground signal is forwarded through MGS 60 causing a grounded S-lead of the STO which in turn causes K1 relay 52 to operate in the junctor ONJ and opening K1 relay contacts 40. A test alternating current signal is then sent from the test tone sender 50 which enters the matrix SMX at the inlet STI passing through the tip and ring leads of the junctor ONJ through the matrix SMX to the outlet STO and which is received by the test tone receiver 57 in the system ATS. Thus, the junctor ONJ is tested for its ability to transmit alternating current signals. The final test performed on the junctor ONJ determines its ability to block answer supervision. A ground signal is forwarded through the S-lead of the outlet STO through MGS 60 from the logic circuit MRL causing the K1 relay 52 in the junctor ONJ to operate which closes the K1 relay contact 62. On an official number junctor, strap-A 64 must remain open, thus a K4 relay 66 does not operate since strap -A remaining open blocks the ground to K4 relay which does not apply hold ground to K1 relay via K4 relay contacts 70. With strap -A open; ground is also blocked from reaching K17 relay 75 in the system ATS through the inlet STI. Hence, K17 relay contact 77 does not operate, and a ground signal indicating answer supervision being detected, is not sensed by the logic circuit MRL of the system ATS. It should be understood that other relays (not shown) are also used in the normal operation of using and dropping the junctor ONJ than are shown in the drawings. Only those relays related to the present circuit test operation of the present invention are shown. It should also be noted that if strap -A were closed that answer supervision would be sensed since the K17 relay in the system ATS would then operate. The strap -A, if closed, functionally converts the operation of the junctor ONJ to an office section junctor which is designed to sense answer supervision. As indicated in FIG. 2, the possibility of a plurality of ONJ junctors may be connected, if desired, to the matrix SMX, all of which can be connected and tested by the system ATS in a similar manner as that described. Also, as shown in FIG. 2, a plurality of terminating junctors 80 and 82 are used to interface through the line matrix LMX 85 to a plurality of telephone subscribers terminal apparatus 87 and 89. Test requests for routine testing of ONJ junctors and the results of tests, which are either passing or failing results, are performed through the use of a teletypewriter 92 which interfaces with the processor CCP through the input/output device buffer 94.

On-Line Expansion of System Call Processing Capabilities

After the initial installation of a telephone switching system, such as the one just described, it frequently becomes necessary to increase the traffic handling and call processing capability of the system by adding hardware apparatus, such as matrices, markers, and space divided apparatus. The existing space divided apparatus in many cases must be rearranged in addition to a requirement of adding new space-divided apparatus due to the changing service requirements of the community which is served by the telephone switching system. The process of adding, deleting and rearranging telephone switching apparatus is referred to as growth.

The automatic test system ATS is a very useful tool in verifying the functional operation of space-divided equipment or apparatus which has been added or rearranged as part of a growth procedure as well as in the initial installation of a new office. The automatic test system not only directly verifies the functional operation of space-divided apparatus, but also verifies that the apparatus was wired and graded properly and that new matrices operate properly. In addition, the system ATS verifies that the data base contained in the computer main memory and the drum memory system identifies the space divided apparatus properly by type and that the space-divided apparatus is precisely equipped as identified in the data base stored information. Since the system ATS tolerates an identifies all types of faults, either within the apparatus under test, with the grading of the apparatus or with its data base identification it is highly useful in performing growth procedures.

Growth testing of new and rearranged apparatus differs from the initial office installations in that the growing office must be capable of carrying on normal call processing traffic, while growth installation and testing operations are performed on-line or in-progress. Thus, it is very important to test the operation of all new and rearranged apparatus before allowing it to be used for processing normal subscriber call traffic. Wiring errors in the grading of the new or rearranged apparatus, data base errors in identifying the apparatus units, and grading errors in addition to faulty units which could possibly have been damaged during shipment if subjected to calls in an active switching system could cause mishandled calls, erroneous billing and degradation of the traffic handling capability of the switching system.

The major function of the system ATS in an operating switching system which is not undergoing growth is to routinely verify the functional operation of the space-divided apparatus units, such as lines, trunks, junctors, senders and receivers. Each unit of space divided apparatus is identified in the stored data base information of the switching system computer memory. This unit identity in the data base is the same information used by the swtiching system call processing software to select units of space-divided apparatus for assignment to specific calls being processed. In an office growth environment, therefore, the system ATS software must be able to identify the units for test but yet restrict call processing from recognizing the availability of the units for assignment. This capability has been built into the system ATS software and is a part of the system in all offices whether or not they are undergoing growth.

In accordance with the present invention, as hereinafter explained in further detail in connection with the software procedures, an example of a typical growth procedure will now be considered. In the present example, it will be assumed that official number junctor 39 of FIG. 2 is to be rendered active and incorporated into the system for the purpose of expanding the call processing capabilities of the system. Such an example is given to illustrate how different types and kinds of equipment may be rendered active and incorporated into the system.

The junctor 39 has been connected into the system and has been physically present therein since the initial installation of the system. In accordance with the present invention, the junctor 39 is rendered inactive and unusable by the system at the time of the initial system installation by indicating an "invalidity" bit in a table stored in memory in the data processor unit that junctor 39 must not be used by the system. The table is a call processing table which provides information for the space-divided equipment units, such as the junctor 39, which information includes the type of the unit (e.g., official number junctor), where it is connected, and other such information, as well as the invalidity bit which causes the system to totally ignore the unit.

In order to initiate the growth procedure, a request is first made to the system by the office craftsman via the teletypewriter 92 to initiate the growth operation by calling the appropriate software programs from memory to be executed by the processor 10. The request includes the identity of the junctor 39 to be added to the system. A growth indicator bit is then set in an automatic test system software table for the purpose of enabling the software programs to overlook the invalidity bit set in the call processing table, since the junctor 39 must first be tested in circuit before permitting it to be used in the system, and for testing purposes the information concerning junctor 43 stored in the call processing table is needed to be employed.

Thereafter, under program control using the information stored in the call processing table, a test path is established through the switching network matrix 36 between maintenance test unit of the automatic test system and the junctor 39, it being understood that the matrix 36 is a part of the call processing switching network for the system and thus the junctor can be tested in circuit. The junctor 39 is then tested as herein described to determine that it can function normally within the system. In this regard, the successful testing of the junctor 39 indicates that the hardware components of the junctor 39 are operative, the information concerning junctor 39 stored in the call processing table is accurate, and the junctor 39 is properly connected into the system at its proper location. In general, the junctor 39 can function properly in all respects in the system, and so thereafter, the junctor 39 is permitted to be used within the system for processing calls by changing the invalidity bit to indicate that junctor 39 information stored therein as well as junctor 39 may be used by the system. The test path is then released.

Software Program Procedures

Figure 3:
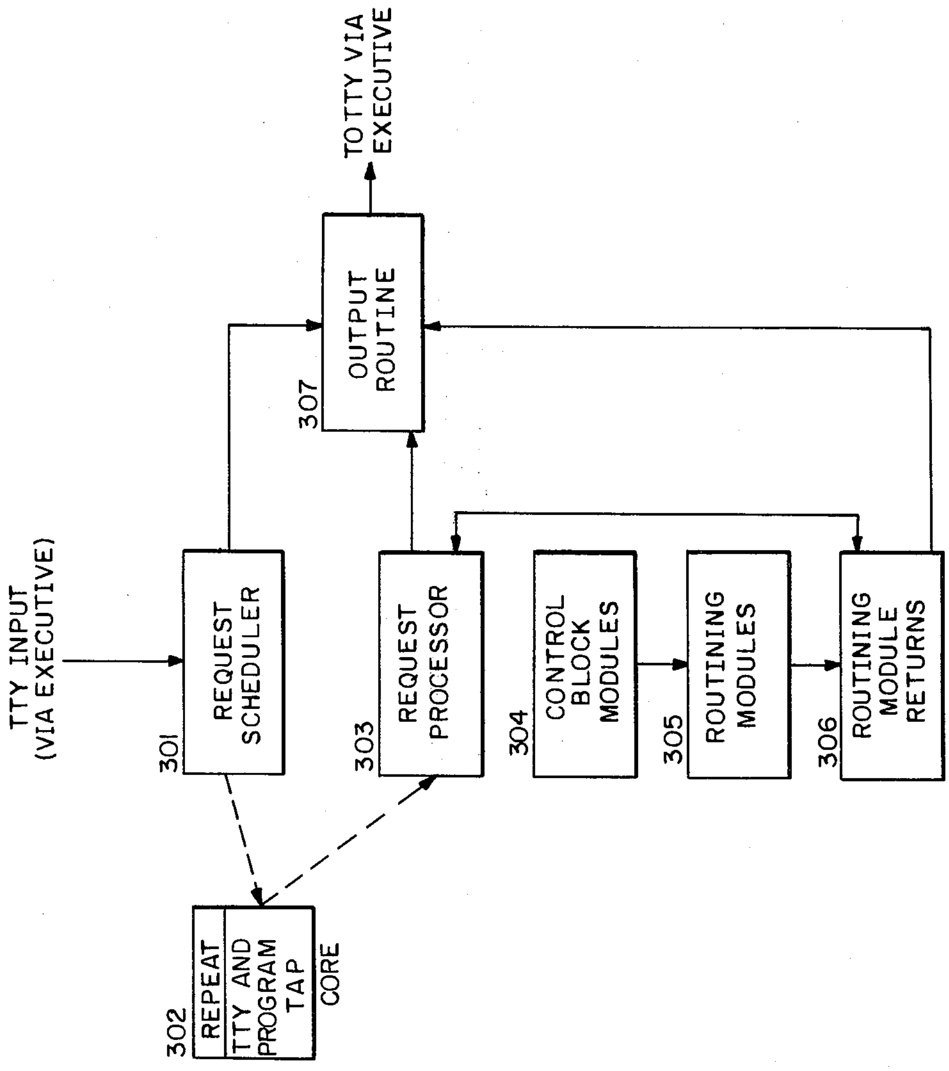
FIG. 3 is a block diagram of the software program procedures used to control the method and apparatus of the present invention.

The program procedures employed for controlling the operation of the method and apparatus of the present invention are in the form of software program modules. Referring now to FIG. 3 of the drawings, a block diagram of the modules controlling the method and apparatus of the present invention is shown. Input requests for system ATS routining functions are entered from a teletypewriter TTY and are passed in formatted data form in the computer main memory CMM to the request scheduler module 301. The request scheduler module verifies that the request is acceptable and adds the request to the teletypewriter and program TAP queue 302. A message indicating the request was accepted is then generated to be printed out via the output routine module 307. Control is then given to the request processor module 303 where the queue TAP is searched for a request. Upon finding the request in the queue TAP, the request processor module 303 sets up data in working storage for one of a plurality of control block modules 304. The control block module generates a teletypewriter message via a subroutine in the request processor module which indicates that the routining function has begun. The control block module also verifies that the request is for a unit or units that are actually equipped, or in the growth mode, overrides certain validity checks and proceeds to set up data in working storage of the memory CMM for the routining module 305. The routining module performs the actual routine interfacing with the markers to set up network paths and the system ATS hardware at the completion of the routine testing of the units as requested, the routine module yields final control to the routining module returns module 306 with an all tests pass indication, a failure indication or an unable-to-test indication due to path blockage or unit busy. The routining module returns module 306 increments a pass, fail or blockage counter and generates an appropriate output message to be output via output routine module 307. Control is then returned to the request processor module 301 which once again brings in the control block module 304. If additional units or tests are to be performed, the routining module 305 is again given control. This cycle continues until the request is satisfied or testing was stopped by request, at which time the block module generates a message indicating the end of the combining function is complete and the final output message is generated via the output routine module 307.

Referring now to FIGS. 4 through 8, there is shown a more detailed flow chart of the software program procedures used for controlling the method and apparatus of the present invention. While it is to be understood that the method and apparatus relating to the present invention is applicable to other types of space-divided apparatus units, assume by way of example that the junctor ONJ as shown in FIG. 2, is being added to an on-line active telephone switching system undergoing growth procedures.

Figure 4:
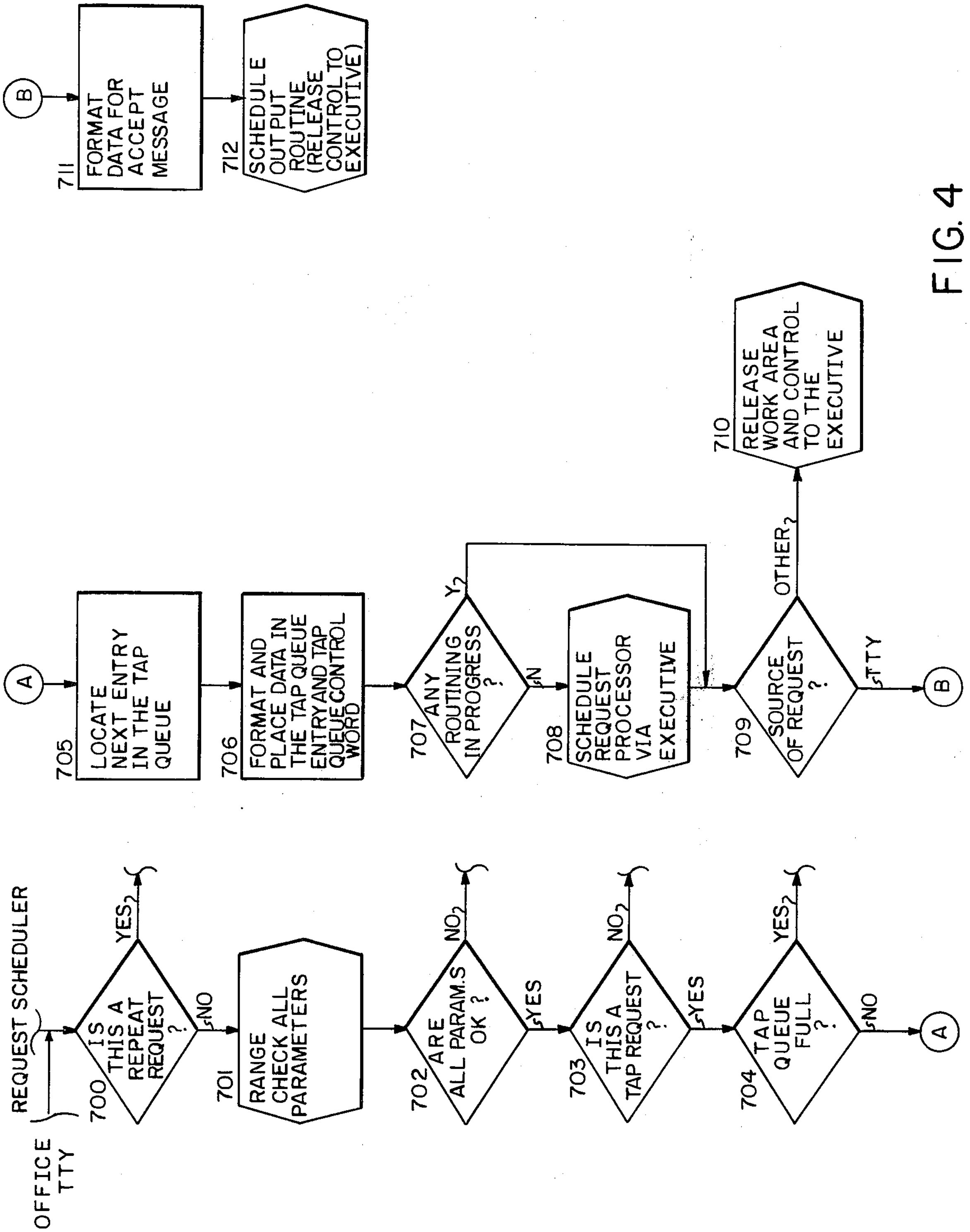
FIGS. 4,5,6A,6B, 7 and 8 are flow chart diagrams of the software program procedures of FIG. 3.

Referring to FIG. 4, the system ATS software receives the request for performing a functional operation routine request for the junctor ONJ (FIG. 1). The request is received in a coded format from a teletypewriter TTY and control is passed to the request scheduler where a test is made to determine if the unit is to be repeatedly tested, as indicated in block 700. Since this example does not indicate repeat testing, the parameters specified in the input message are checked for acceptable range, as shown in blocks 702 and 703. After having verified that the junctor ONJ specified is in range, the request is added to the queue TAP, as shown in blocks 703 through 706. Next, the request processor module is scheduled, if it is not already active (blocks 707 and 708). Finally, since this example request source was from a teletypewriter, a message is generated and formatted to be printed via the output routine module which indicates the original request is accepted and control is released to the system executive program.

Figure 5:
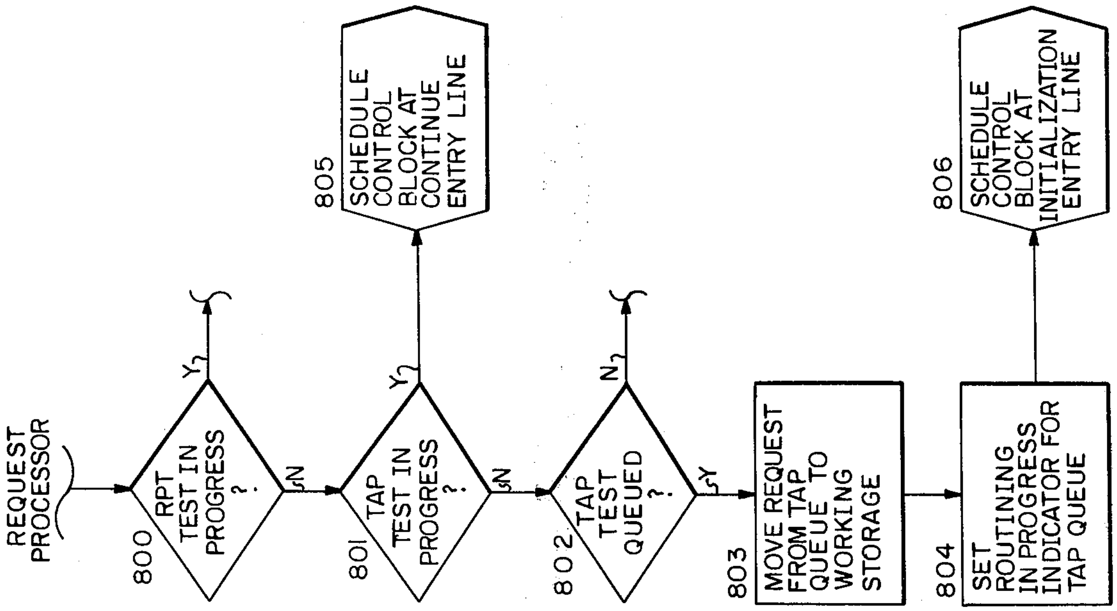

Referring now to FIG. 5, the request processor module is given control either because it was scheduled by the request scheduler module 708 or because it is already processing a request. After determining that a repeat test is not in progress or that a queue TAP request is not active, blocks 800 and 801, a search is made to determine if any queue TAP requests are present, block 802. The request processor module then finding the request of the present example in the queue TAP, moves the request to working storage and sets the proper routining in progress indicator, blocks 803 and 804. Control is then scheduled to return next to the trunk and junctor routining control block module, block 806.

Figure 6A:
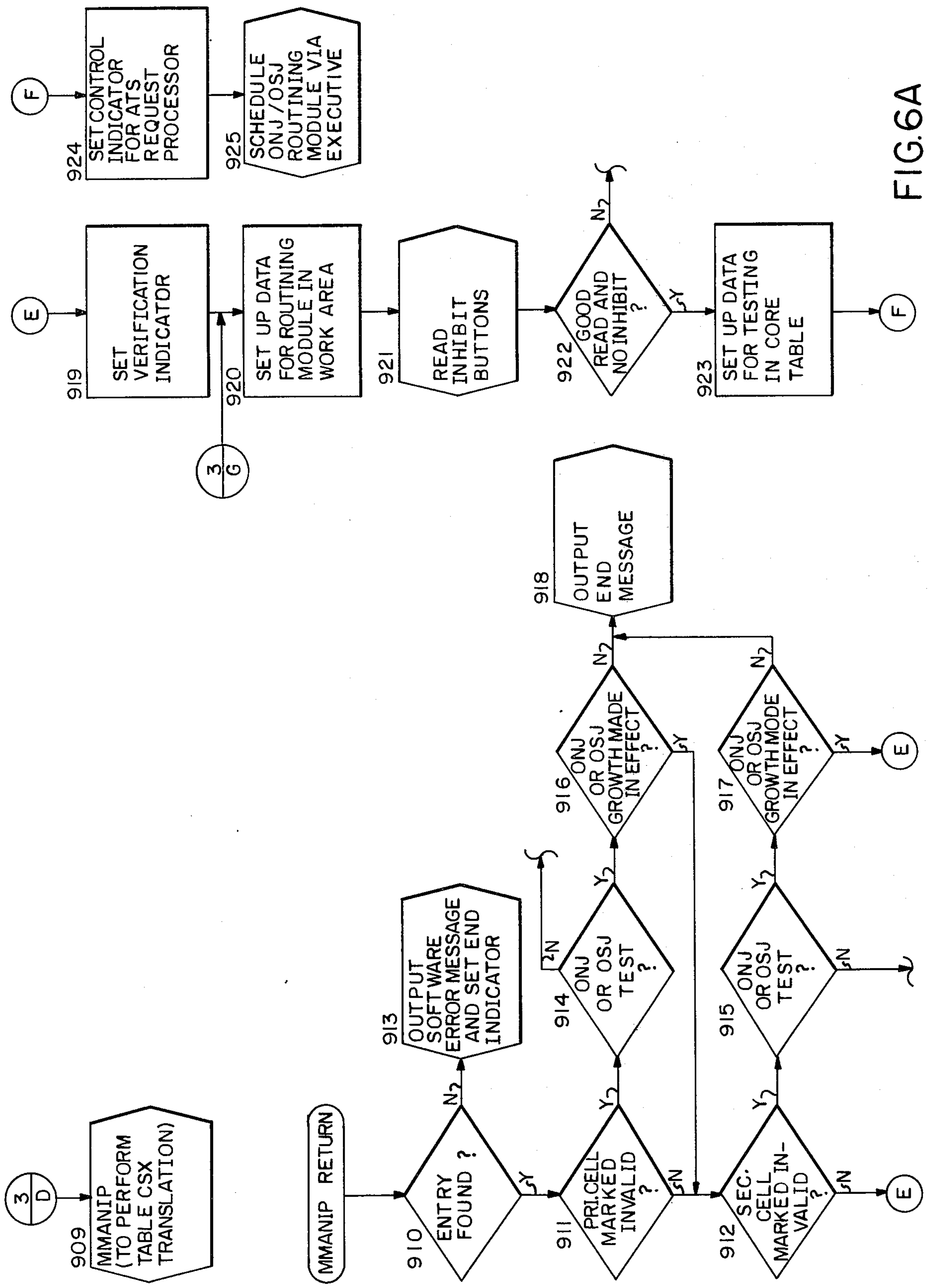
Figure 6B:
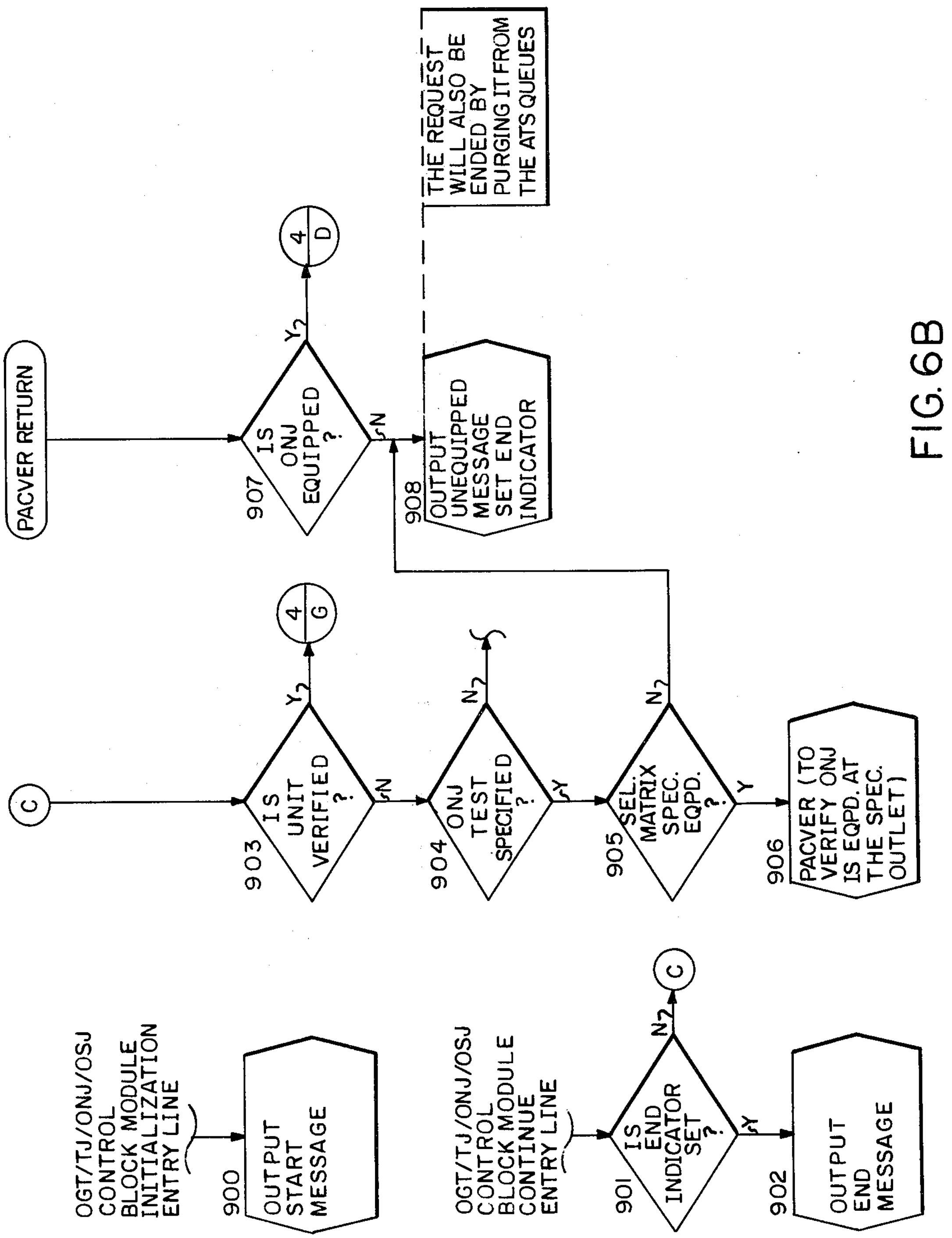

Referring to FIG. 6, the trunk and junctor routining control block module after receiving control at its initialization entry line, block 900, generates a teletypewriter output message via a subroutine which indicates the routining test has begun. After the completion of message generation, control is returned to the trunk and junctor routining control block module at its continue entry line where a test is made to determine if all tests honoring this request are complete, block 901. Since this is the first pass through the control block module for this request, the end indicator is not set and a test is made to discover if the specified junctor ONJ has been previously verified as being equipped in this switching system. Then since it has not been previously verified, a test is made to see if a junctor ONJ is specified to be tested, block 904. This request being a junctor ONJ test, a test is then madde to verify that the matrix SMX as specified on the original teletypewriter input request is actually equipped. Since the matrix SMX in the present example is equipped, control is given to a parameter conversion and verification module PACVER to verify that the identity of the unit on the matrix SMX as reflected in the data base acutally represents the junctor ONJ, block 906. At the return from the module PACVER, block 907, a check is made to determine if the junctor ONJ is equipped. If the unit as specified is not reflected in the data base in any way, an output message is generated indicating that the unit is not equipped and the original request is purged from the queue TAP, block 908. It should be noted that this output message detects misnoted errors between the actual hardware connection of the unit under test and how that specific unit is reflected in the data base. Since the unit is equipped in the present example, control is given to a data base table searching module MMANIP, block 909, to obtain specific data from the table CSX relating to the grading of the specified junctor ONJ as reflected in the data base. When control is returned, block 910, a test is made to determine if the entry was found and if not found, a message is generated, block 913, which indicates an error was determined in the data base reflecting conflicting data. When the required data from table CSX is found, a test is made to find if either the primary or secondary cell is marked invalid, blocks 911 and 912. An invalid primary cell prevents call processing from using a range of junctors whereas an invalid secondary cell prevents call processing from using a single junctor. In a non-growth environment, the system ATS software is also prevented from accessing units marked invalid. Next, the trunk and junctor routining control block module performs a test of a special indicator in table HLI to determine that a growth situation is presently active. If growth is not in progress, a message is generated indicating the completion of the request has been reached and the request is purged from the queue TAP, as shown in blocks 914 through 918. Since growth is indicated in the present example, an indicator is set signifying verification of the request is complete, block 919. Next, the junctor ONJ data is formatted and stored in the work area to be passed to the routining module. The inhibit junctor ONJ hardware manual switches (not shown) are then read, as shown in blocks 921 and 922. Thereafter, several indicators are set up and the junctor ONJ routining module is scheduled via the system executive program, blocks 923 through 925.

Figure 7:
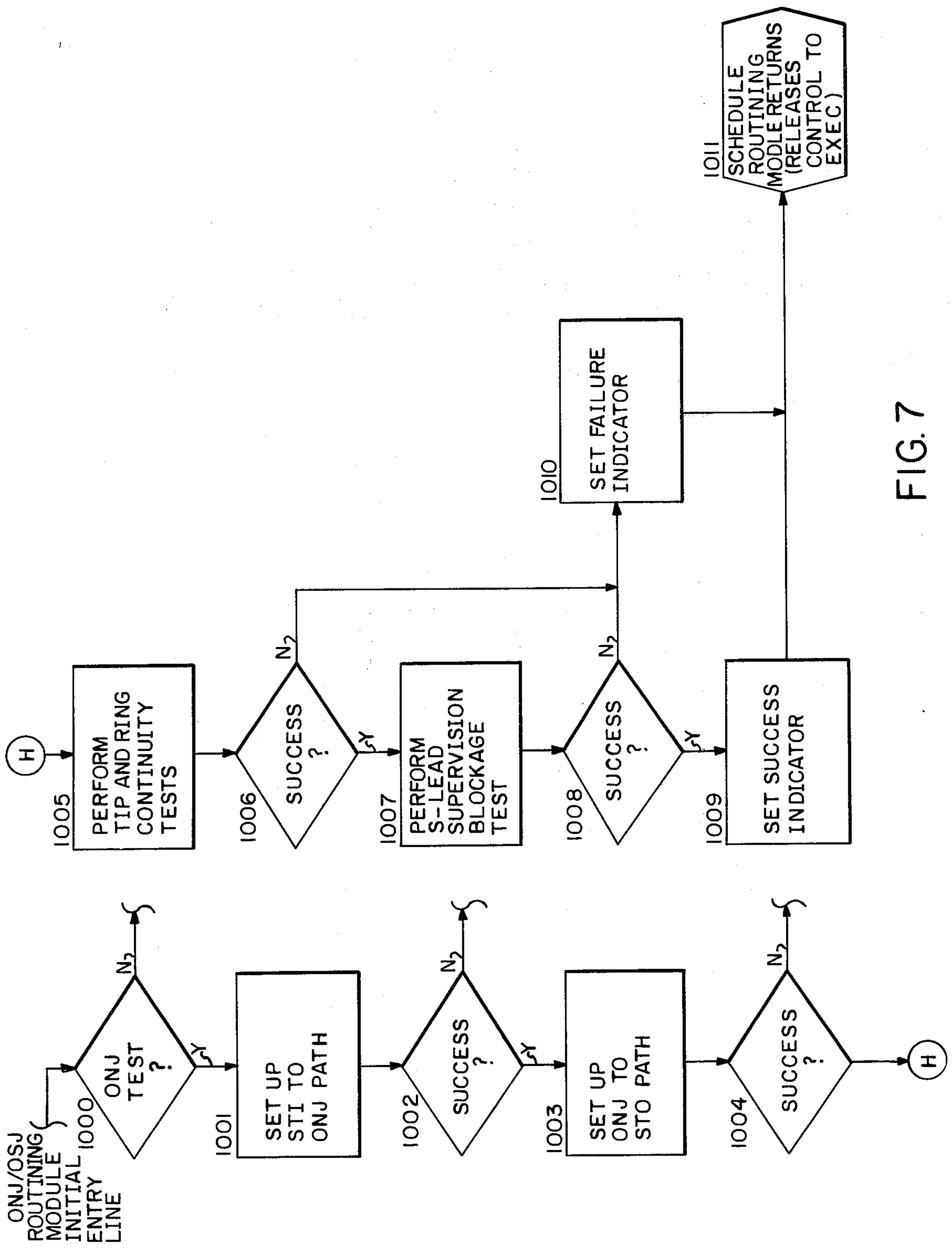

Referring now to FIG. 7 of the drawings, the junctor ONJ routining module upon receiving control, first determines that a junctor ONJ test is requested, as shown in block 1000. A network path is then set up from the inlet STI to one end of the junctor ONJ and a second network path is set up from the other side of the junctor ONJ to the outlet STO as shown in FIG. 2 and in blocks 1001 through 1004. The logic unit MRL is then informed to perform continuity tests and S-lead supervision blockage tests on the requested junctor ONJ, as shown in blocks 1005 through 1008. These tests are performed as described in the foregoing hardware description. Next, an all-tests-pass indicator, block 1009, or a test fail indicator is set, block 1010, and control is then yielded to the routining module returns module, block 1011.

Figure 8:
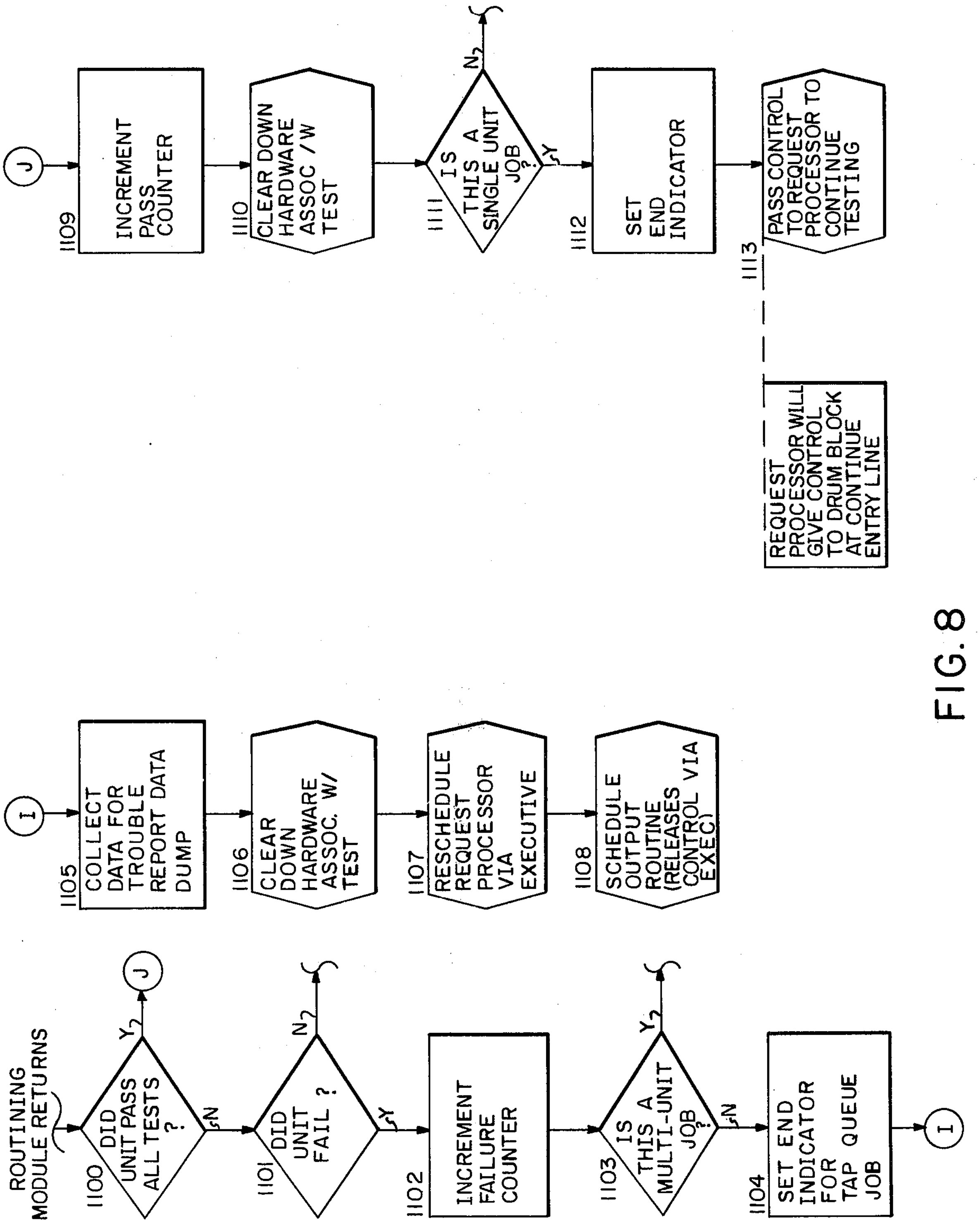

Referring now to FIG. 8, the routining module returns module upon receiving control determines if the unit under test, which in the case of the present example is a junctor ONJ, has passed all tests, block 1100. If the unit passed all present tests, the pass counter is incremented and the hardware used in the test is cleared including dropping the network paths involved, as shown in blocks 1109 and 1110. If it is determined that this is a single unit test request, a test completion indicator is then set and control is given to the request processor module at its continue entry line, blocks 1111 through 1113. If, however, any of the tests performed on the junctor ONJ failed, the fail counter for the queue TAP is incremented and a test termination indicator is set, blocks 1101 through 1104. Data to be printed out with the unit trouble report message is then collected and all hardware, including network paths, is cleared down to an idle state and control is scheduled to return to the request processor module where the request is purged from the queue TAP and the final output message is printed.

While the foregoing described software program is the preferred manner of controlling the method and apparatus of the present invention, it is to be understood that other programs may also be employed and that suitable hardware circuits or manually controlled switches may be employed to control the method and apparatus of the present invention.

What is claimed is:

1. In a communication switching system having a switching network for establishing connections between calling and called lines and common equipment for controling apparatus to establish connections via said switching network, and having space-divided equipment units communicating with the common equipment for performing a plurality of different control operations for processing of calls through the switching network, a method of on-line expansion of call processing capabilities, comprising:

providing and connecting in communication with the common equipment additional space-divided units beyond that originally provided;

coupling memory means to said common equipment for storing equipment information concerning said additional units;

storing invalidity information in said memory means for the purpose of rendering said additional units unusable by the system common equipment;

coupling testing means to said switching equipment for checking the operation of said additional units;

establishing a path through the switching network between said testing means and said additional units in accordance with said equipment information;

testing said additional units;

thereafter storing growth indicator information in said memory means for indicating that said invalidity information is to be ignored;

and changing said invalidity information to permit the system to use said additional units.

2. In a communication switching system having a switching network for establishing connections between calling and called lines and common equipment for controlling apparatus to establish connections via said switching network, and having space-divided equipment units communicating with the common equipment for performing a plurality of different control operations for processing of calls through the switching network, an apparatus for on-line expansion of call processing capabilities, comprising:

additional space-divided units beyond that originally provided;

means for connecting said additional space-divided units in communication with the common equipment;

memory means for storing equipment information concerning said additional units;

means for storing invalidity information in said memory means for the purpose of rendering said additional units unusable by the system common equipment;

testing means for checking the operation of said additional space-divided units;

means including said switching network and said common equipment for establishing a path from said testing means to said additional units in accordance with said equipment information for testing said additional units;

means for storing growth indicator information in said memory means for indicating that said invalidity information is to be ignored;

and means for changing said invalidity information to permit the system to use said additional units.

* * * * *